United States Patent
Glazer et al.

Patent Number: 5,560,626
Date of Patent: Oct. 1, 1996

[54] CART FOR NEGOTIATING ESCALATORS

[75] Inventors: Guilford Glazer, 1901 Ave. of the Stars, Ste 1555, Los Angeles, Calif. 90067; Red Williams, Newhall, Calif.

[73] Assignee: Guilford Glazer, Los Angeles, Calif.

[21] Appl. No.: 442,370

[22] Filed: May 16, 1995

Related U.S. Application Data

[62] Division of Ser. No. 094,754, Jul. 20, 1993, Pat. No. 5,516,127.

[51] Int. Cl.$^6$ ........................................ B62B 5/04
[52] U.S. Cl. ............................ 280/33.994; 280/5.2; 188/5
[58] Field of Search ........................ 280/33.991, 33.992, 280/33.994, 5.24, 5.32, 5.2; 188/5, 19, 20, 23, 22, 31

[56] References Cited

U.S. PATENT DOCUMENTS

| | | |
|---|---|---|
| 306,561 | 10/1884 | Vaughan . |
| 988,527 | 4/1911 | Wiseman . |
| 1,179,391 | 4/1916 | Bachman . |
| 1,317,222 | 9/1919 | Rowland et al. . |
| 3,005,513 | 10/1961 | Larson . |
| 3,095,211 | 6/1963 | Altherr . |
| 3,146,872 | 9/1964 | Prucha . |
| 3,231,050 | 1/1966 | Belyeu . |
| 3,305,064 | 2/1967 | Mullis et al. . |
| 3,405,783 | 10/1968 | Clark et al. . |
| 3,501,164 | 3/1970 | Peterson . |
| 3,836,160 | 9/1974 | Linsley . |
| 4,326,622 | 4/1982 | Ellzey . |
| 4,381,870 | 5/1983 | Muelner . |
| 4,728,119 | 3/1988 | Sigafoo . |
| 4,733,877 | 3/1988 | Pastien . |
| 4,840,388 | 6/1989 | Doughty . |
| 4,960,179 | 10/1990 | Leach . |
| 4,960,302 | 10/1990 | Walters . |
| 5,078,350 | 1/1992 | Zorichak . |
| 5,141,240 | 8/1992 | Heilig . |
| 5,271,634 | 12/1993 | Walton . |
| 5,288,089 | 2/1994 | Bowers et al. ............... 280/33.994 |

FOREIGN PATENT DOCUMENTS

| | | | |
|---|---|---|---|
| 2532605 | 3/1984 | France | ............... 280/33.992 |
| 2038149 | 2/1972 | Germany | ............... 280/5.2 |
| 2325685 | 12/1974 | Germany . | |

*Primary Examiner*—Richard M. Camby
*Attorney, Agent, or Firm*—Merchant, Gould, Smith, Edell, Welter & Schmidt

[57] ABSTRACT

A cart having a lower frame and wheel means for moving the cart on a surface, includes a surface engaging means extending below the lower frame. When the cart engages an escalator step, the surface engaging means grips the escalator step thereby hindering movement of the cart relative to the escalator step. Normally when the cart moves on a flat surface, the surface engaging means is above the lower plane defined by the lower level of the wheel means. The surface engaging includes a saw tooth base for engaging the step. In some embodiments there is a lid for closing the shopping cart and selectively locking the basket of the shopping cart. Means is provided for selectively locking one or more wheels of the shopping cart at the same time as the lid is locked.

10 Claims, 5 Drawing Sheets

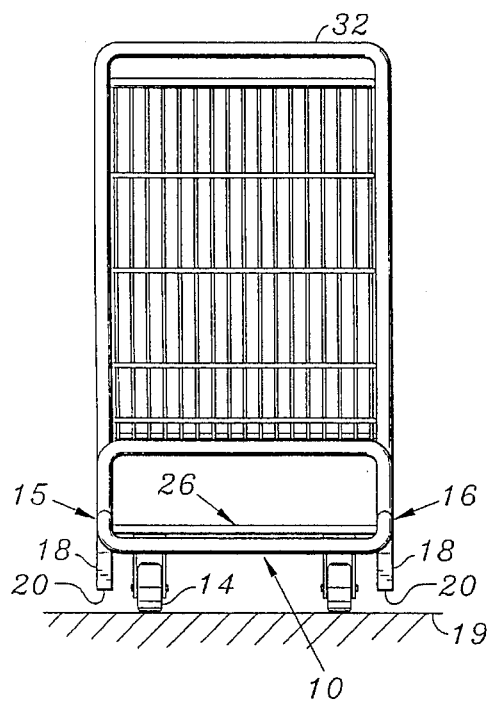
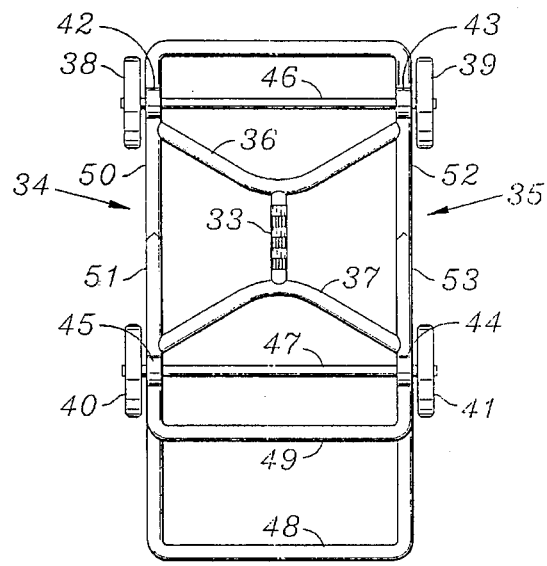
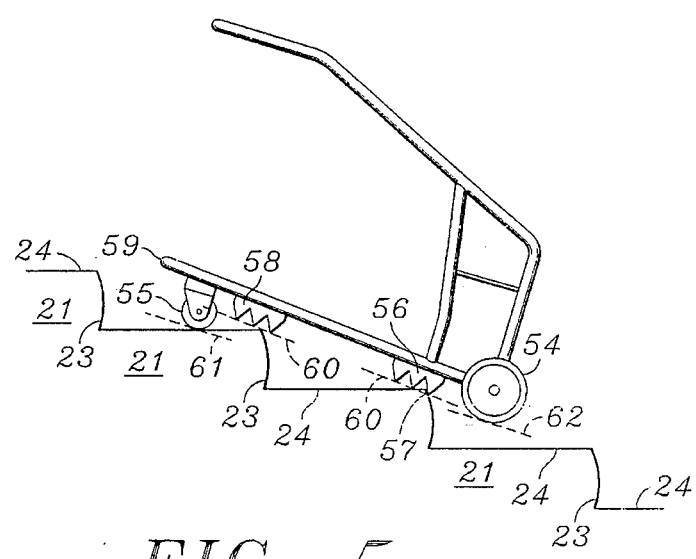

CART FOR NEGOTIATING ESCALATORS

This is a divisional of application Ser. No. 08/094,754, filed Jul. 20, 1993 now U.S. Pat. No. 5,516,127, which application(s) are incorporated herein by reference.

BACKGROUND

Being able to move a shopping cart safely up and down an escalator without tipping forwards or falling backwards is valuable.

This invention relates to carts. In particular, it relates to shopping carts capable of negotiating escalators without falling backwards or tipping forwards.

A difficulty of using carts in buildings which have multi-floors joined by escalators is the obstacle of traversing the escalators with the cart. It is unknown to have a shopping cart which can safely negotiate an escalator without falling backwards when the escalator is going up or tipping forwards when the escalator is going down.

The present invention seeks to overcome this difficulty for carts, whether they be shopping carts, luggage carts, dollies, strollers, or other vehicles having wheels so that they can be pushed or pulled on a surface by an operator.

SUMMARY

This invention minimizes the difficulties associated with moving carts up and down escalators.

According to the invention, a cart comprises a lower frame extending between longitudinally spaced forward and trailing ends. Wheel means are mounted relative to the lower frame for movably supporting the lower frame on the surface. Surface engaging means extends above a lower plane defined by the lower level of the wheel means such that when the surface between the forward and trailing ends is substantially level, the surface engaging means is removed from engagement at the surface. When the surface between the forward and trailing ends is relatively higher than the surface at the forward and trailing ends, the surface engaging means engages the relatively higher surface, thereby hindering movement over the surface.

The surface engaging means preferably includes an element mounted to either side of the lower frame and there is a friction element including a saw tooth face for the engaging surface. The saw tooth face is intended to engage the step surface of a moving step of an escalator. As the escalator steps rise or fall from a flat level position to a protruded position, the juncture of the flat and vertical faces of the step engage appropriately with a tooth of the saw tooth face, thereby to hinder movement of the cart.

The cart preferably includes an upwardly directed member mounted with the lower frame adjacent to opposite sides over the lower frame. There is an upper frame operatively connected with the upwardly directed member so as to define an opposite port suitable for carrying a load.

The lower frame can be substantially horizontally directed or angularly directed relative to a flat horizontal surface.

In a further aspect of the invention, the cart includes a lid which is pivotable to open and close a basket for the cart when the cart is a shopping cart if the lid is lockable on top of the basket.

In still a further preferred form of the invention, the cart includes a handle means for pushing and pulling the cart as necessary. The handle means is pivotable with an extension for selectively locking the wheel means. When the cart is in the form of a shopping cart, the wheel means is locked when the lid of the basket is locked.

The invention is now further described with reference to the accompanying drawings.

DRAWINGS

FIG. 3 is a rear view of a shopping cart showing the wheels relative to a substantially level surface and the surface engaging means above the surface.

FIG. 4 is a top view of a different cart having diagonally crossed side frames and a single surface engaging member between the sides.

FIG. 5 is a view of a different cart negotiating an escalator moving downwardly with a surface engaging means engaging a step of the escalator.

FIG. 7b is a detailed view of the locking mechanism of FIG. 7a.

DESCRIPTION

Shopping Cart

Figure 1:
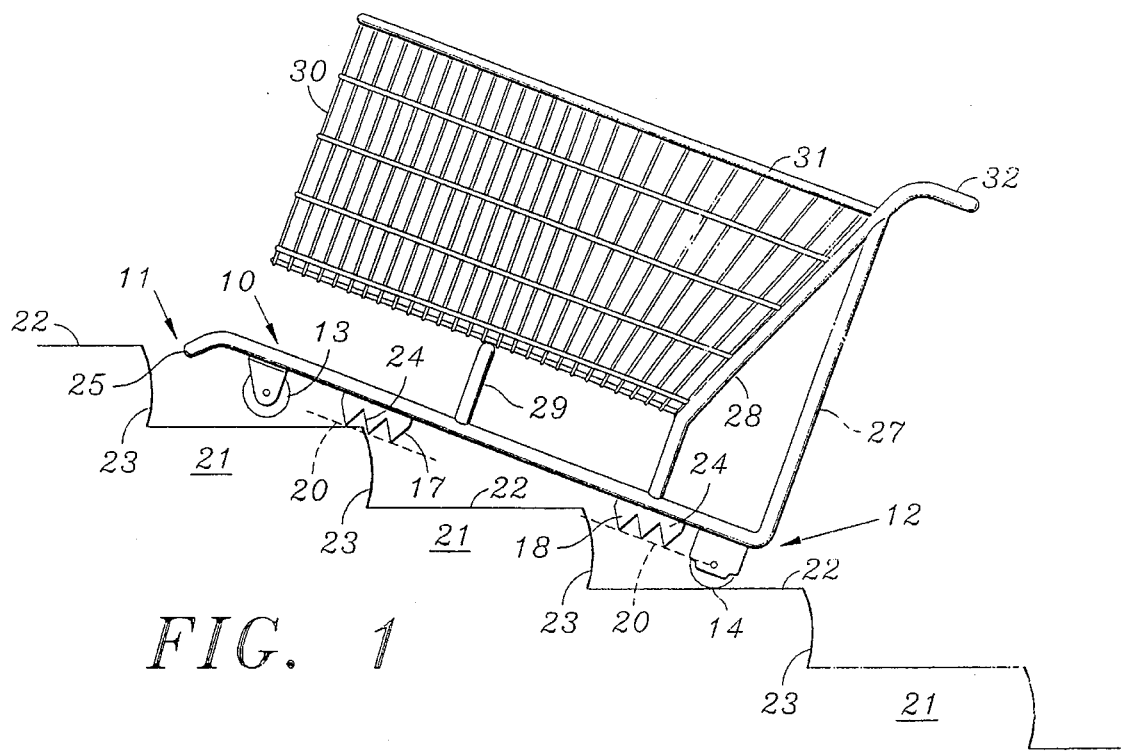
FIG. 1 is a side view of a shopping cart in a position on an escalator moving upwardly with a first surface engaging means engaging a step.

A shopping cart includes a lower frame 10 extending between a longitudinally spaced forward end 11 and trailing end 12. The lower frame 10 defines a surface 26 for carrying a load as necessary. Wheel means, including at least three wheels, are mounted below the lower frame 10. A forward pair of wheels 13 is mounted substantially adjacent to the forward end 11. A rearward pair of wheels 14 is mounted substantially adjacent to the trailing end 12 of the shopping cart. The wheels 13 and 14 are also mounted substantially adjacent to oppositely disposed sides 15 and 16 of the shopping cart.

A pair of surface engaging means 17 and 18 is mounted on each side 15 and 16 respectively of the frame. The surface engaging means 18 is mounted towards the trailing end 12 and the surface engaging means 17 is mounted forwardly towards the forward end 11 of the frame. The surface engaging means extends above a lower plane 19 defined by the wheel means 14 and which is the same as a substantially level surface 19. The lower plane 20 of the surface engaging means 17 and 18 is above the plane 19 when the cart moves on the level surface 19. The surface between the forward end 11 and trailing end 12 of the cart can be relatively higher than the surface 19 at the forward and trailing ends 11 and 12 respectively. In such a situation, as illustrated in FIG. 1, the step 21 has a flat portion 22 and a relatively vertical portion 23 which would be above a flat surface defined by the bottom of the wheels 13 and 14. The interface between the horizontal portion 22 and vertical portion 23 engages a saw tooth face 24 thereby hindering movement of the cart over the surface.

Figure 2:
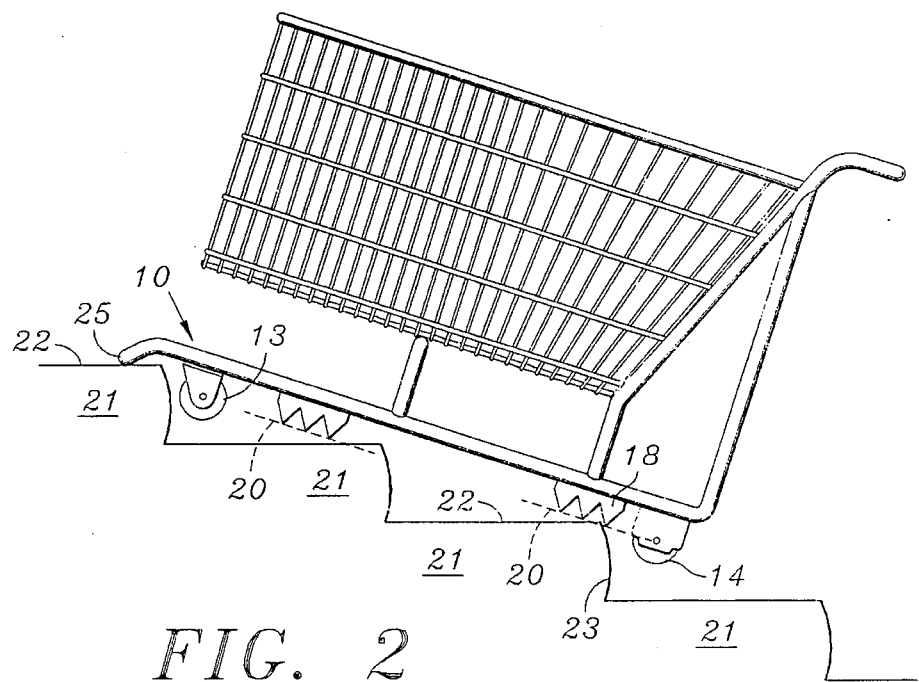
FIG. 2 is a side view of a shopping cart on an escalator moving upwardly with a different surface engaging means engaging a step of the escalator.

In FIG. 1, the forward surface engaging means 17 engages the step 21. In FIG. 2, the rear surface engaging member 18 engages the step 21. In FIG. 1, the rear wheel 14 engages step 21. In FIG. 2, none of the wheels 13 nor wheels 14 engage the escalator. The forward end 25 of the frame 10 engages the flat surface 22 of step 21 and the rear surface engaging means 18 engages the interface between the surface 22 and the upright portion 23 of the step 21.

The surface engaging means 17 and 18 is made of a suitable material to provide an effective friction engagement to hinder the movement of the cart as necessary. As such, the material may be a durable rubber or could be metal or plastic.

The cart also has upwardly directed frame members 27, 28 and 29 which are directed from the lower frame 10. These frame members 27, 28 and 29 support a basket configuration 30 for receiving a load of a shopping cart. There is also an upper frame member 31 which facilitates the mounting of the basket 30. The upward frame member 28 ends in a handle 32 for pushing and pulling the cart as necessary.

The wheels 13 and 14 are located substantially adjacent to the opposite sides 15 and 16 and are aligned transversely along the longitudinal axis. In FIG. 3, the wheels 13 and 14 are also slightly inset from the opposite sides 15 and 16. The wheels 13 at the forward end are relatively inset from the end 25 of the lower frame.

Pushcart and Stroller

In FIG. 4, a single surface engaging means 33 is used to effect hinderance. This is disposed substantially midway between the opposite sides 34 and 35 of a pushcart or stroller for a child. Only the frame construction is shown. The surface engaging means 33 is held in position by angular configurations 36 and 37 which are directed inwardly from the area of the wheels 38, 39, 40 and 41 so that the surface engaging means 33 is substantially centrally located relative to the lower frame. In such a situation, the lower frame is not a horizontal configuration but is formed by a suitable construction supporting the wheels 38, 39, 40 and 41. The wheels are supported on bearing configuration 42, 43, 44 and 45, respectively. Axles 46 and 47 are shown horizontally directed between the opposite sides 34 and 35 of the cart. The handle 48 for pushing the cart is shown extending rearwardly of the cart. The top frame construction 49 would support a seat inwardly disposed from the rear handle 48. The diagonally directed cross members 50, 51, 52 and 53 are shown on opposite sides of the cart and can be part of the lower frame.

Luggage Cart

In FIG. 5, there is shown a luggage cart traversing the downwardly moving escalator having steps 21. The cart includes two forward wheels 54 and a rearward castor or wheel 55. Wheel 55 engages the surface 24 of step 21 and wheels 54 are suspended above the surface 24. The forward surface engaging means 56 engages the interface of the leading step with the saw tooth face 57 acting to hinder the movement of the cart down the escalator. The surface engaging means 58 rearwardly disposed towards the trailing end 59 of the cart is located slightly above the interface between the flat portion 24 and upwardly directed face 23 of the step 21. The plane 60 defined by the lower position of the saw tooth face 57 of the surface engaging means is located at a higher position than the plane 61 as defined by the rear wheels 55 or the plane 62 as defined by the wheel 54.

Locking Means

Figure 6:
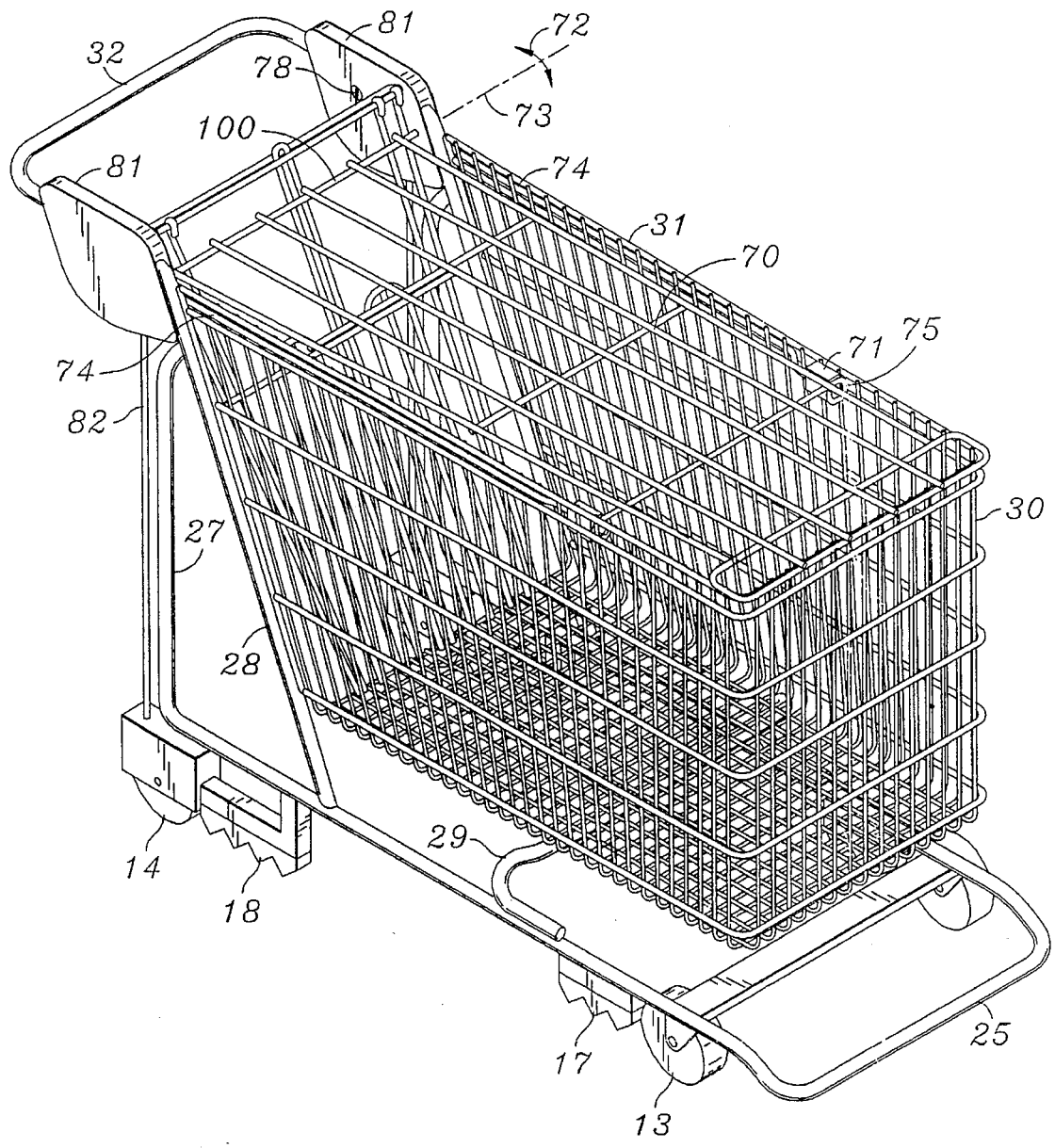
FIG. 6 is a perspective view of a different cart having a top lid hinged for opening and closing relative to the basket.

In the embodiment illustrated in FIG. 6, there is illustrated a shopping cart with a basket 30. There is provided a lid 70 which is mounted about pivot 80 to open and close as indicated by arrow 72 about axis 73. The lid 70 is closed as illustrated in FIG. 6. Locking bars 74 on opposite sides of the cart can move longitudinally forwardly to engage respective lock rings 75 towards the forward end of the opposite sides of the upper frame 31. The rods 74 move forwardly and backwardly as indicated by arrow 76. Such rods 74 are activated by a bar 77 which is affixed with handle 32 which is mounted to pivot about position 80. The end 79 of bar 77 engages the bars 74 to push them forwardly or permit retraction according to the position of handle 32. The pivot position 80 is located in spaced housings 81 located at either side of the handle 32.

Figure 7A:
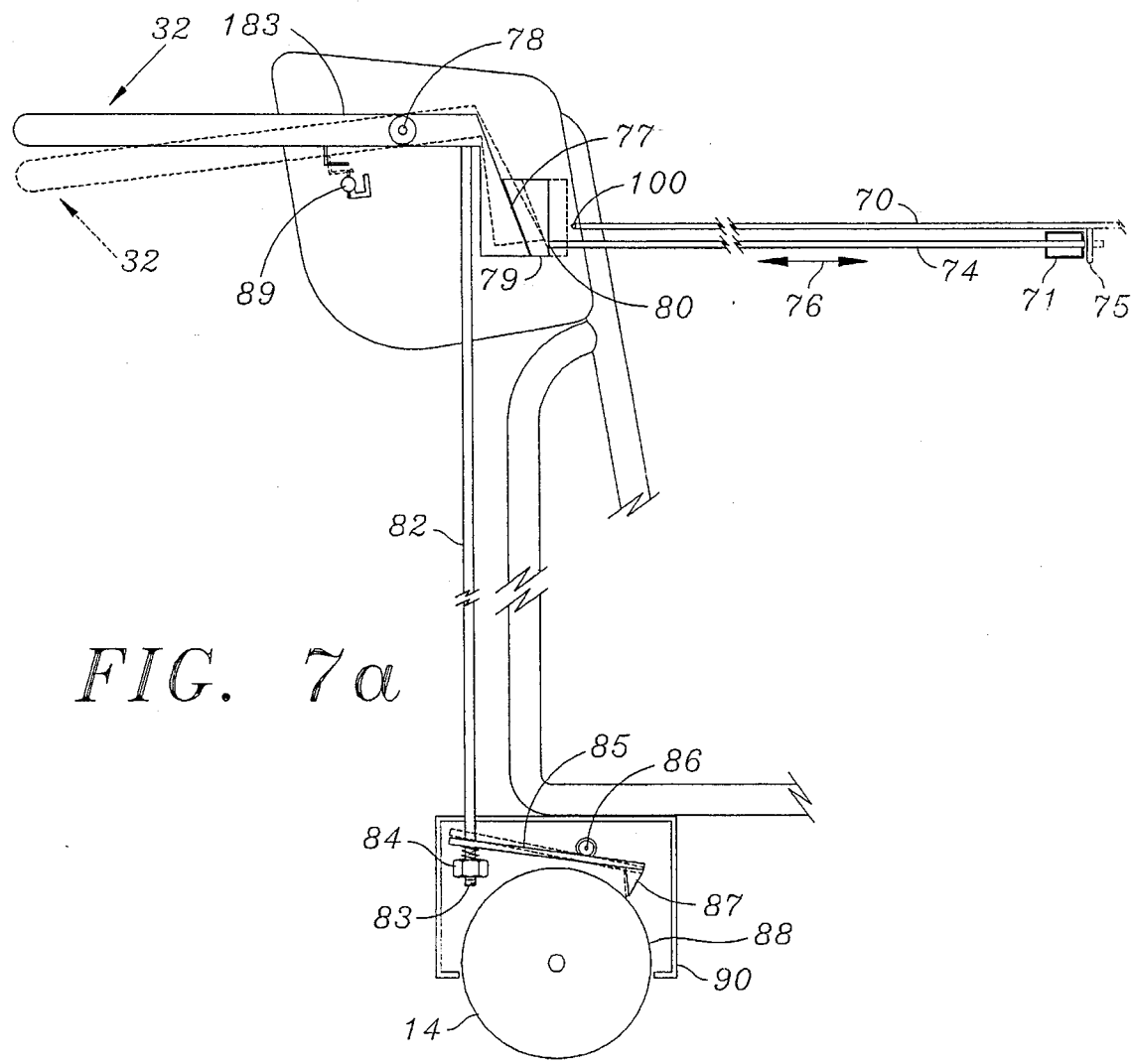
FIG. 7a is a detailed view showing the locking mechanism for a wheel means and the lid operable with the cart of FIG. 6.
Figure 7B:
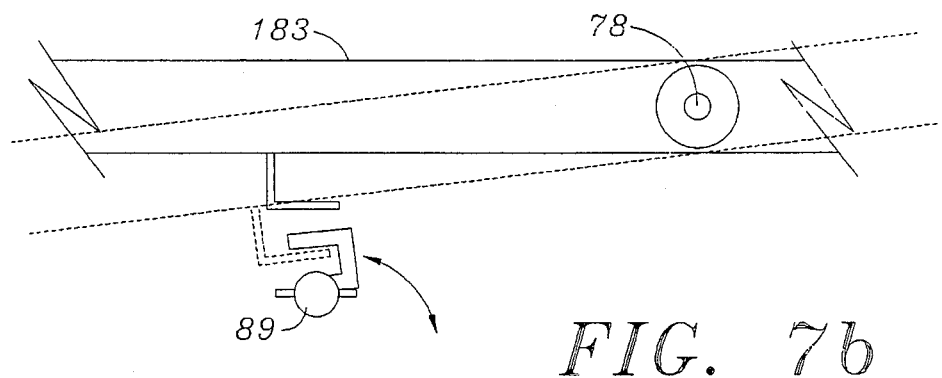

Also, associated with the embodiment illustrated in FIGS. 6, 7a and 7b is a means for locking rear wheels 14. In this connection there are vertical rods 82 which operate bolts located on opposite sides of the handle 32. The bars 82 have free ends 83 with nuts 84 screw connected to the threaded ends 83.

Cross bars 85 are affixed to the ends of bars 82 to pivot about position 86. A tooth 87 at the opposite free end of each bar 85 is provided for digging into the surface engaging section 88 of wheel 14.

Thus, when the side bars 183 of the handle 32 are pushed upwardly as illustrated in FIG. 7a, as opposed to downwardly as illustrated in phantom in FIG. 7a, the rods 82 are also pulled upwardly. This causes the tooth 87 to engage the surface 88 of wheels 14.

The lock feature 89 can then be activated to lock the side bars 83 in the position shown in FIG. 7b.

Shopping Cart with Baby Seat

Figure 8:
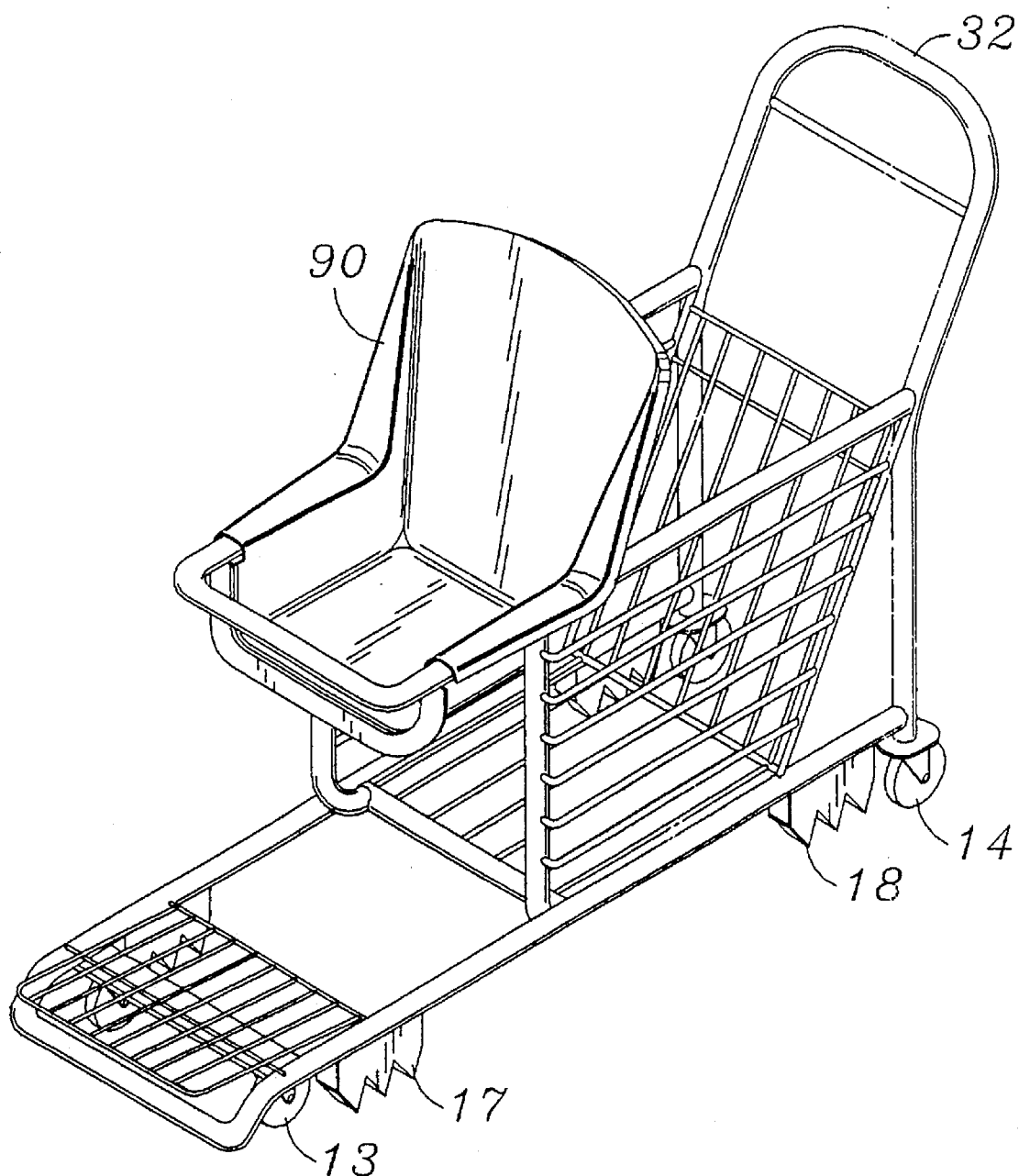
FIG. 8 is a perspective view of the shopping cart with a baby seat mounted in the forward position of the cart.

As illustrated in FIG. 8 there is shown a cart configuration useful as a shopping cart having a baby seat. The baby seat 90 is mounted on the forward end of the upper frame end of basket 31. The surface engaging means 17 and 18 are provided on the frame to engage steps of an escalator.

The tooth means 88 for locking the wheel 14 is encased in a casing 90 so as to prevent possible tampering with the locking mechanism.

In different embodiments, the lock means may operate on carts with or without a shopping basket and with or without the facilities of a luggage cart, or baby seat.

General

Many other examples of the invention exist, each differing from the others in matters of detail only. The invention is to be determined solely in terms of the following claims.

We claim:

1. A shopping cart comprising:
   a frame for carrying a load wherein the frame extends between longitudinally spaced forward and trailing ends;
   wheels mounted below the frame substantially adjacent to the forward and trailing ends for movably supporting the frame on a surface;
   saw tooth surface engaging means, mounted below the frame and adjacent to and between the wheels such that the surface engaging means are spaced from each adjacent wheel a distance which is less than the distance between adjacent surface engaging means; and a load carrying basket mounted on and overlying the frame, the basket including a pivotally mounted and closable lid for overlying the basket when the lid is closed.

2. A cart as claimed in claim 1 including surface engaging means extending below the frame means such that when the surface between the forward and trailing ends is substantially level, the surface engaging means is removed from the surface, and when the surface between the forward and trailing ends is relatively higher than the surface at the forward and trailing ends, the engaging means engages the relatively higher surface thereby hindering movement over the surface, a pair of surface engaging means being mounted substantially including between the forward and trailing ends and being at opposite sides respectively of the cart, the means providing a friction surface for engaging the relatively higher surface.

3. A cart as claimed in claim 1 wherein the surface engaging means includes a saw tooth face for the engaging surface, the saw tooth face being for engaging an escalator step on a moving surface.

4. A cart as claimed in claim 1 including means for selectively locking the wheel means.

5. A cart as claimed in claim 2 including means for selectively locking the wheel means.

6. A cart as claimed in claim 3 including means for selectively locking the wheel means.

7. A cart as claimed in claim 1 including handle means pivotable between selected positions and wherein in a first position with the lid means is lockable with the basket means.

8. A cart as claimed in claim 7 wherein the handle means operates both means for selectively engaging the wheel means such that in a first position the wheel means is locatable when the lid means is lockable.

9. A shopping cart comprising:

a lower frame for carrying a load wherein the frame extends between longitudinally spaced forward and trailing ends;

wheels mounted below the lower frame adjacent to the forward or trailing ends for movably supporting the lower frame on a surface;

at least two upwardly directed members mounted on opposite sides of the lower frame;

an upper frame for carrying a load mounted on the upwardly directed members, wherein the upper frame overlays the lower frame;

saw tooth surface engaging means, mounted below the frame and adjacent to and between the wheels such that the surface engaging means are spaced from each adjacent wheel a distance which is less than the distance between adjacent surface engaging means; and a handle movable between selected positions, wherein a first position operates to lock the wheels of the cart and a second position operates to unlock the wheels of the cart.

10. A cart as claimed in claim 9 including surface engaging means extending below the frame means such that when the surface between the forward and trailing ends is substantially level, the surface engaging means is removed from the surface, and when the surface between the forward and trailing ends is relatively higher than the surface at the forward and trailing ends, the engaging means engages the relatively higher surface thereby hindering movement over the surface, a pair of surface engaging means being mounted substantially including between the forward and trailing ends and being at opposite sides respectively of the cart, the means providing a friction surface for engaging the relatively higher surface.

* * * * *